(12) United States Patent
Shibata

(10) Patent No.: US 10,836,404 B2
(45) Date of Patent: Nov. 17, 2020

(54) DRIVER ASSISTANCE DEVICE FOR NOTIFYING DRIVER OF ASSISTANCE USING VEHICLE-TO-VEHICLE COMMUNICATION

(71) Applicant: PANASONIC INTELLECTUAL PROPERTY MANAGEMENT CO., LTD., Osaka (JP)

(72) Inventor: Teppei Shibata, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/371,894

(22) Filed: Apr. 1, 2019

(65) Prior Publication Data

US 2019/0300018 A1    Oct. 3, 2019

(30) Foreign Application Priority Data

Apr. 2, 2018   (JP) .................................. 2018-071017

(51) Int. Cl.
| | |
|---|---|
| *B60Q 1/00* | (2006.01) |
| *B60W 50/14* | (2020.01) |
| *B60W 30/095* | (2012.01) |
| *H04W 4/46* | (2018.01) |
| *G01S 5/00* | (2006.01) |

(52) U.S. Cl.
CPC ........ *B60W 50/14* (2013.01); *B60W 30/0956* (2013.01); *G01S 5/0072* (2013.01); *H04W 4/46* (2018.02); *B60W 2050/143* (2013.01)

(58) Field of Classification Search
None
See application file for complete search history.

(56) References Cited

U.S. PATENT DOCUMENTS

2015/0177007 A1 *  6/2015  Su .......................... G01C 21/34
                                                        701/25

FOREIGN PATENT DOCUMENTS

JP    2006-099453    4/2006

* cited by examiner

*Primary Examiner* — Adolf Dsouza
(74) *Attorney, Agent, or Firm* — Greenblum & Bernstein, P.L.C.

(57) ABSTRACT

A driver assistance device configured to be mounted on a first vehicle is provided. The device receives first positions and first speeds of the first vehicle, and receives second positions, second speeds, and events of a second vehicle. Each of the first positions, the first speeds, the second positions, the second speeds, and the events is on a timeline. A first approach time is derived based on a first current position of the first vehicle, a first current speed of the first vehicle, a second current position of the second vehicle, and a second current speed of the second vehicle. A second approach time is derived based on the first current position, the first current speed, and a past position of the second vehicle. Information is output to a driver of the first vehicle based on at least the first and second approach times.

10 Claims, 11 Drawing Sheets

DRIVER ASSISTANCE DEVICE FOR NOTIFYING DRIVER OF ASSISTANCE USING VEHICLE-TO-VEHICLE COMMUNICATION

BACKGROUND

1. Field

The present disclosure relates to notification technologies and, more particularly, to a driver assistance device adapted to notify a driver of driver assistance by using vehicle-to-vehicle communication.

2. Description of the Related Art

A vehicle-to-vehicle communication system makes it possible to access information related to the traveling route of the driver's vehicle by exchanging, with other vehicles, information such as the traffic information and the driving situation known to the respective vehicles, and the surrounding situation sensed by the driver's vehicle. When another vehicle senses unusual vehicle control such as emergency braking, for example, the vehicle transmits a signal indicating that such control has been detected to a following vehicle (the driver's vehicle). Upon receiving the signal, the driver's vehicle determines the likelihood of approaching the other vehicle. When it is determined that the driver's vehicle approaches the other vehicle, the driver is notified of the risk of collision (see, for example, patent document 1).

[patent document 1] JP2006-99453

When unusual vehicle control occurs in the other vehicle, there is a likelihood that an obstacle for traveling vehicles is located at the site of occurrence. Therefore, it is not only necessary to notify the driver that the driver's vehicle may approach the other vehicle that is unusually controlled but to notify the driver that the driver's vehicle may approach the site where unusual vehicle control has occurred.

SUMMARY

The disclosure addresses the above-described issue, and a general purpose thereof is to provide a technology directed to driver assistance using vehicle-to-vehicle communication, capable of preventing driving from becoming more dangerous even in the presence of another vehicle that is controlled unusually.

A driver assistance device according to an embodiment of the disclosure is configured to be mounted on a vehicle and includes: a first acquisition unit that acquires first positioning information including position information and speed information on a host vehicle; a second acquisition unit that acquires: second positioning information including position information and speed information on a remote vehicle; and an event occurrence notification indicating an occurrence of an event in the remote vehicle; and an output unit that outputs, in the event that the second acquisition unit has acquired an event occurrence notification, driver assistance in accordance with at least one of: (1) a first approach time derived based on the position information included in the second positioning information, the position information included in the first positioning information, and a relative speed identified by referring to the speed information included in the first positioning information and the speed information included in the second positioning information, the first approach time being expected to elapse until the host vehicle approaches the remote vehicle; and (2) a second approach time derived based on position information on a site where the event has occurred updated based on the position information included in the second positioning information, the position information included in the first positioning information, and the speed information included in the first positioning information, the second approach time being expected to elapse until the host vehicle approaches the site where the event has occurred.

Optional combinations of the aforementioned constituting elements, and implementations of the disclosure in the form of methods, apparatuses, systems, recording mediums, and computer programs may also be practiced as additional modes of the present disclosure.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

Figure 1A:
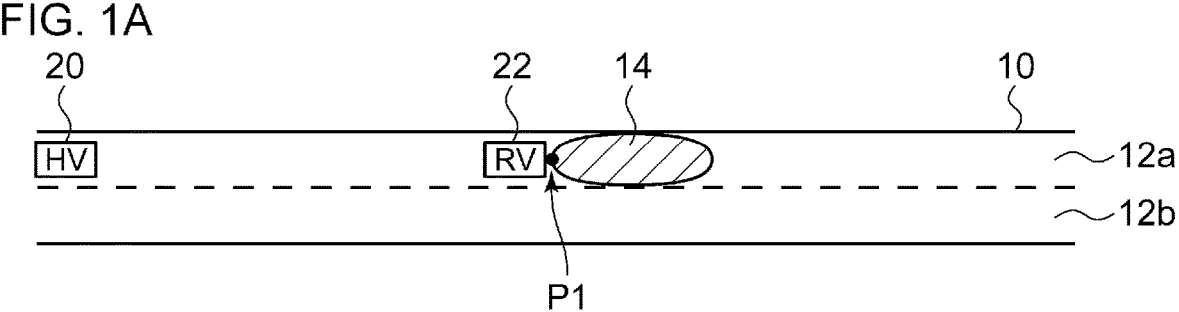
FIGS. 1A-1D show an outline of the process in the host vehicle according to an embodiment.

The invention will now be described by reference to the preferred embodiments. This does not intend to limit the scope of the present invention, but to exemplify the invention.

A summary will be given before describing the disclosure in specific details. The embodiment relates to a driver assistance device that uses a communication system for performing vehicle-to-vehicle communication between terminal devices mounted on vehicles and that notifies the driver of the risk of colliding with another vehicle based on a signal received from the other vehicle. Such a communication system is called an intelligent transport system (ITS). Like wireless local area network (LAN) that conforms to a standard such as IEEE802.11, the communication system uses access control function called carrier sensor multiple access with collision avoidance (CSMA/CA). For this reason, a given radio channel is shared by a plurality of terminal devices. Meanwhile, it is necessary to transmit information to an unspecified number of terminal devices in ITS. To perform such transmission efficiently, the communication system broadcasts a packet signal. In other words, the terminal device in vehicle-to-vehicle communication broadcasts a packet signal that stores position information, orientation information, speed information, etc. on the vehicle. Further, the other terminal device receives the packet signal and recognizes an approaching vehicle based on the aforementioned information.

In this embodiment, the terminal device corresponds to the driver assistance device. Further, one of the vehicles on which the driver assistance device according to the embodiment is mounted will be referred to as a host vehicle. The embodiment will be described by highlighting the operation of the driver assistance device mounted on the host vehicle. Vehicles other than the host vehicle will be referred to as remote vehicles. The driver assistance device is also mounted on the remote vehicles. The driver assistance device mounted on the remote vehicles may be the same as or different from the driver assistance device according to the embodiment. In the case the driver assistance device mounted on the host vehicle and the driver assistance device mounted on a remote vehicle are distinguished, the driver assistance device mounted on the host vehicle may be referred to as a host driver assistance device, and the driver assistance device mounted on the remote vehicle may be referred to as a remote driver assistance device. Further, transmission of a packet signal from the driver assistance device mounted on a vehicle may be referred to as transmission of a packet signal from the vehicle, for clarity of explanation.

One of the applications provided by the driver assistance device to the driver is a control loss warning (CLW) safety application. A CLW safety application outputs an alert to the driver of the host vehicle when an emergency control loss event occurs in a remote vehicle. An emergency control loss event is exemplified by activation of an antilock brake system (ABS), a traction control system (TCS), or a stability control system (SCS). In the case the host vehicle is traveling behind a remote vehicle in the same direction as the remote vehicle, a control loss event may occur in the remote vehicle, which triggers transmission of a notification (hereinafter, "event occurrence notification") indicating the occurrence of the control loss event from the remote vehicle. In the host vehicle receiving the event occurrence notification, an alert is output at a point of time when the driver of the host vehicle can avoid a collision with the remote vehicle. This is also done when the host vehicle is traveling to face the remote vehicle in the direction opposite to the direction of the remote vehicle.

According to such a CLW safety application, an alert for avoiding a collision with the remote vehicle in which the control loss event has occurred is issued to the driver of the host vehicle. However, the driver of the host vehicle is not alerted of the site where the control loss event has occurred in the remote vehicle. The host vehicle may become uncontrollable at the site. It is therefore desired to alert the driver of the host vehicle of the presence of the site. To address this requirement, the driver assistance device according to the embodiment alerts the driver that the host vehicle may approach the site where the control loss event has occurred in the remote vehicle as well as alerting the driver that the host vehicle may approach the remote vehicle in which the control loss event has occurred. The alert prompts the driver to make a decision. In this process, the notification is made in such a manner that a sufficient time is left for the driver to make a decision.

An outline of the process of the embodiment will be explained with reference to FIGS. 1A-1D and FIGS. 4A-4B, and then the configuration of the driver assistance device according to the embodiment will be described in specific details. FIGS. 1A-1D show an outline of the process in the host vehicle 20. A road 10 extends in the horizontal direction and includes a first lane 12a and a second lane 12b, which are generically referred to as lanes 12. The first lane 12a and the second lane 12b extend in opposite directions, the first lane 12a extending rightward, and the second lane 12b extending leftward. Referring to FIG. 1A, the host vehicle 20 travels on the first lane 12a to follow a remote vehicle 22. In other words, the host vehicle 20 and the remote vehicle 22 travel in the same direction. The host vehicle 20 transmits first positioning information that includes position information, speed information, etc., and the remote vehicle 22 transmits second positioning information that includes position information, speed information, etc. Thereby, the host vehicle 20 and the remote vehicle 22 exchange these items of information. On the first lane 12a, a frozen area 14 is located to the right of the remote vehicle 22. As the remote vehicle 22 enters the frozen area 14, ABS is activated at point P1, generating a control loss event. When the control loss event occurs, the remote vehicle 22 includes an event occurrence notification in the transmission. The host vehicle 20 receives the event occurrence notification and the second positioning information. The host vehicle 20 recognizes the occurrence of the control loss event in the remote vehicle 22. Further, the host vehicle 20 derives a time (hereinafter, "first approach time") that is expected to elapse until the host vehicle 20 approaches the remote vehicle 22 at point P1, based on the first positioning information and the second positioning information. When the first approach time is equal to or less than a threshold value, the host vehicle 20 outputs an alert to the driver.

Figure 1B:
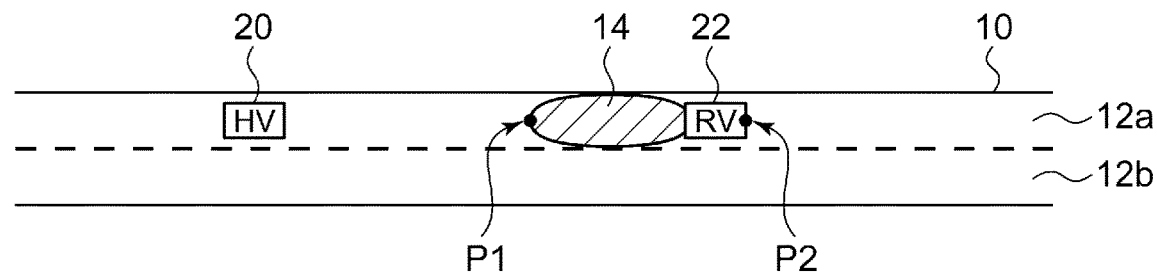

FIG. 1B shows a situation that occurs after the situation in FIG. 1A. The remote vehicle 22 advances to point P2 while the control loss event is continued. The remote vehicle 22 includes an event occurrence notification in the transmission. Upon receiving the event occurrence notification and the second positioning information, the host vehicle 20 derives the first approach time that is expected to elapse until the host vehicle 20 approaches the remote vehicle 22 at point P2, as described above. The host vehicle 20 also compares point P1 and point P2 where the events have occurred. The host vehicle 20 selects point P1 closer to the host vehicle 20 and derives an approach time (hereinafter, "second approach time") that is expected to elapse until the host vehicle 20 approaches point P1 where the event has occurred. When at least one of the first approach time and the second approach time is equal to or less than a threshold value, the host vehicle 20 outputs an alert to the driver. The threshold value for the first approach time and that of the second approach time may be different, but it will be assumed below that the values are equal.

Figure 1C:
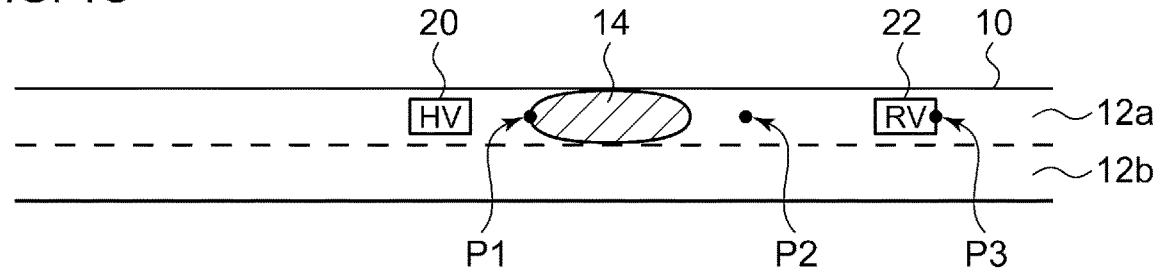

FIG. 1C shows a situation that occurs after the situation in FIG. 1B. The remote vehicle 22 advances to point P3 while the control loss event is continued. The remote vehicle 22 includes an event occurrence notification in the transmission. Upon receiving the event occurrence notification and the second positioning information, the host vehicle 20 derives the first approach time that is expected to elapse until the host vehicle 20 approaches the remote vehicle 22 at point P3, as described above. The host vehicle 20 also compares point P1 and point P3 where the events have occurred. The host vehicle 20 selects point P1 closer to the host vehicle 20 and derives the second approach time that is expected to elapse until the host vehicle 20 approaches point P1 where the event has occurred. When at least one of the first approach time and the second approach time is equal to or less than a threshold value, the host vehicle 20 outputs an alert to the driver.

Figure 1D:
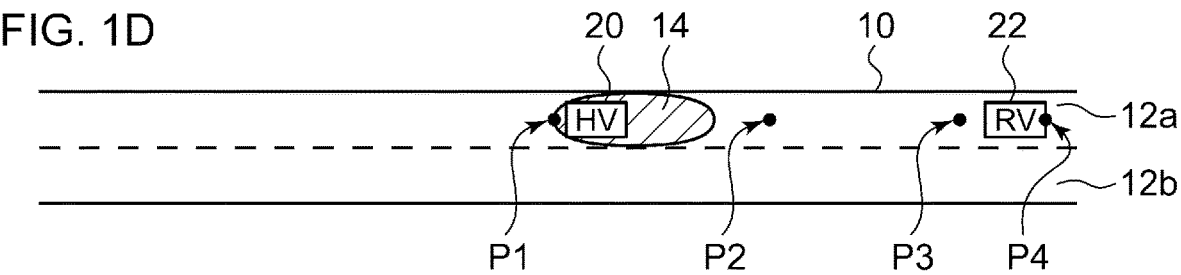

Referring to FIG. 1D, the host vehicle 20 passes point P1 where the event has occurred. Thus, the host vehicle 20 discards the information related to point P1 where the event has occurred. When the control loss event is terminated in the remote vehicle 22 that has advanced to point P4, the remote vehicle 22 does not transmit an event occurrence notification. Thus, the host vehicle 20 does not receive an event occurrence notification and so terminates the alert. When the control loss event is continued in the remote vehicle 22, on the other hand, the remote vehicle 22 includes an event occurrence notification in the transmission. Upon receiving the event occurrence notification and the second positioning information, the host vehicle 20 returns to the step of FIG. 1A.

Figure 2A:
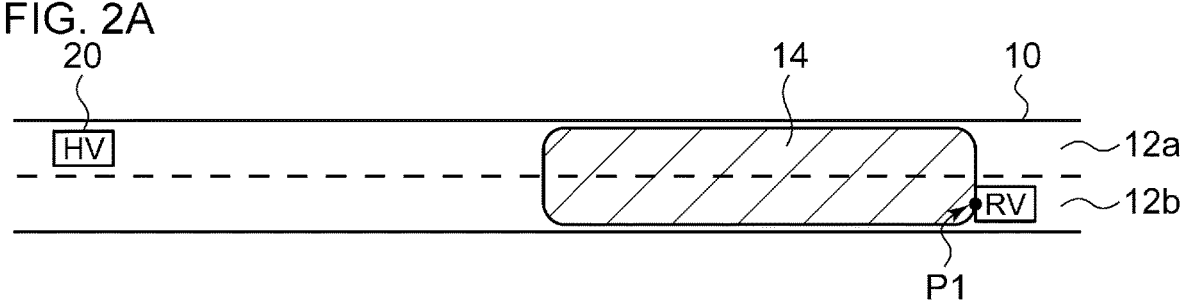
FIGS. 2A-2D show an outline of another process in the host vehicle according to the embodiment.

FIGS. 2A-2D show an outline of another process in the host vehicle 20 according to the embodiment. The road 10, the first lane 12a, and the second lane 12b are shown as they are shown in FIGS. 1A-1D. Referring to FIG. 2A, the host vehicle 20 travels on the first lane 12a to face the remote vehicle 22 on the second lane 12b. In other words, the host vehicle 20 and the remote vehicle 22 travel in opposite directions. In this case, too, the host vehicle 20 transmits the first positioning information, and the remote vehicle 22 transmits the second positioning information. The frozen area 14 is located to left of the remote vehicle 22 to extend across the first lane 12a and the second lane 12b. As the remote vehicle 22 enters the frozen area 14, ABS is activated at point P1, generating a control loss event. When the control loss event occurs, the remote vehicle 22 includes an event occurrence notification in the transmission. The host vehicle 20 receives the event occurrence notification and the second positioning information. The host vehicle 20 recognizes the occurrence of the control loss event in the remote vehicle 22. Further, the host vehicle 20 derives the first approach time that is expected to elapse until the host vehicle 20 approaches the remote vehicle 22 at point P1, based on the first positioning information and the second positioning information. When the first approach time is equal to or less than the threshold value, the host vehicle 20 outputs an alert to the driver.

Figure 2B:
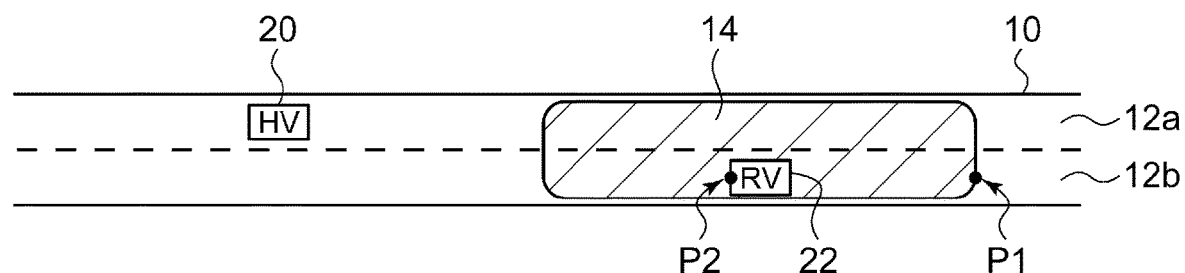

FIG. 2B shows a situation that occurs after the situation in FIG. 2A. The remote vehicle 22 advances to point P2 while the control loss event is continued. The remote vehicle 22 includes an event occurrence notification in the transmission. Upon receiving the event occurrence notification and the second positioning information, the host vehicle 20 derives the first approach time that is expected to elapse until the host vehicle 20 approaches the remote vehicle 22 at point P2, as described above. The host vehicle 20 also compares point P1 and point P2 where the events have occurred. The host vehicle 20 selects point P2 closer to the host vehicle 20 and derives the second approach time that is expected to elapse until the host vehicle 20 approaches point P2 where the event has occurred. When at least one of the first approach time and the second approach time is equal to or less than a threshold value, the host vehicle 20 outputs an alert to the driver.

Figure 2C:
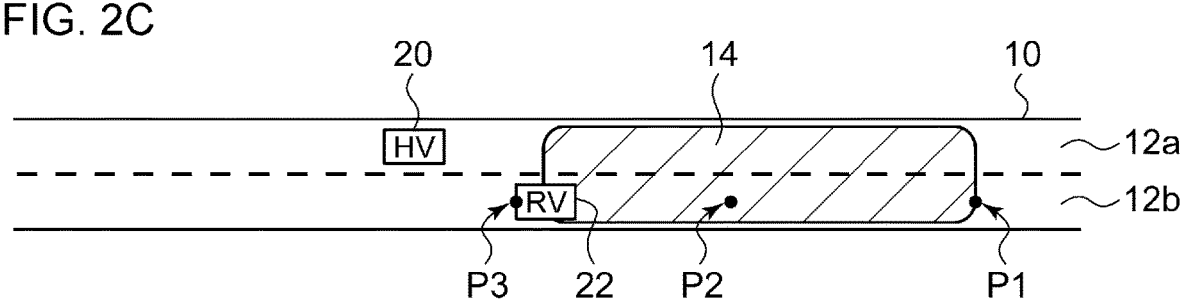
Figure 2D:
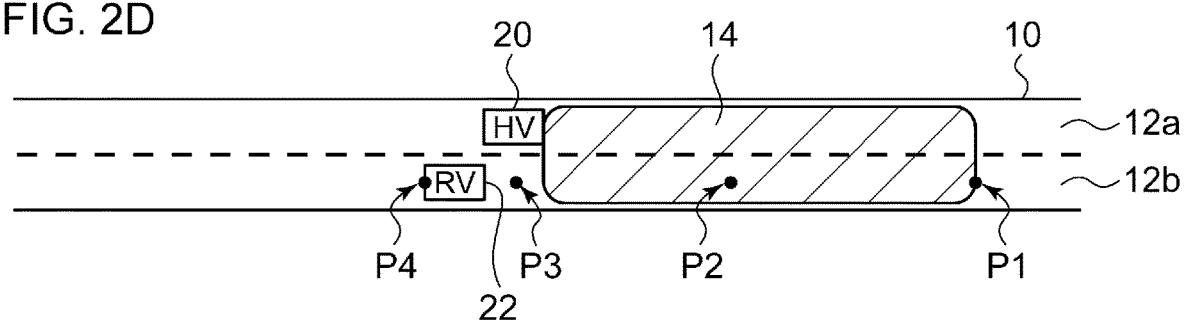

FIG. 2C shows a situation that occurs after the situation in FIG. 2B. The remote vehicle 22 advances to point P3 while the control loss event is continued. The remote vehicle 22 includes an event occurrence notification in the transmission. Upon receiving the event occurrence notification and the second positioning information, the host vehicle 20 derives the first approach time that is expected to elapse until the host vehicle 20 approaches the remote vehicle 22 at point P3, as described above. The host vehicle 20 also compares point P2 and point P3 where the events have occurred. The host vehicle 20 selects point P3 closer to the host vehicle 20 and derives the second approach time that is expected to elapse until the host vehicle 20 approaches point P3 where the event has occurred. When at least one of the first approach time and the second approach time is equal to or less than a threshold value, the host vehicle 20 outputs an alert to the driver. Referring to FIG. 2D, the host vehicle 20 passes point P3 where the event has occurred. Thus, the host vehicle 20 discards the information related to point P3 where the event has occurred and terminates the alert.

Figure 3A:
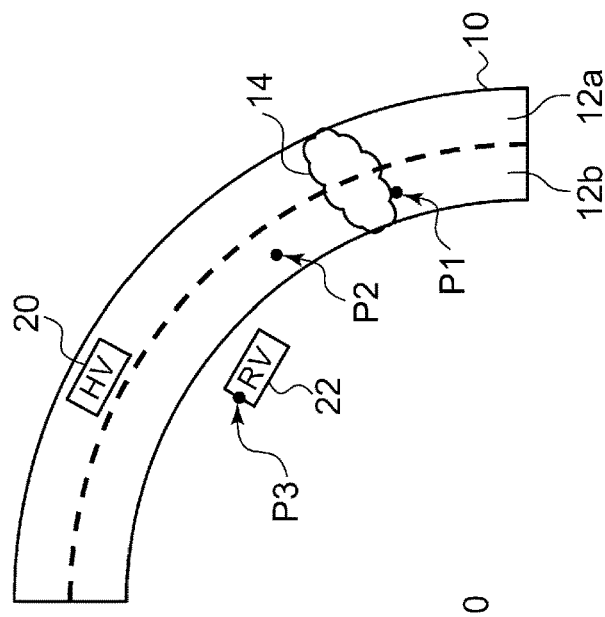
FIGS. 3A-3C show an outline of another process in the host vehicle according to the embodiment.
Figure 3B:
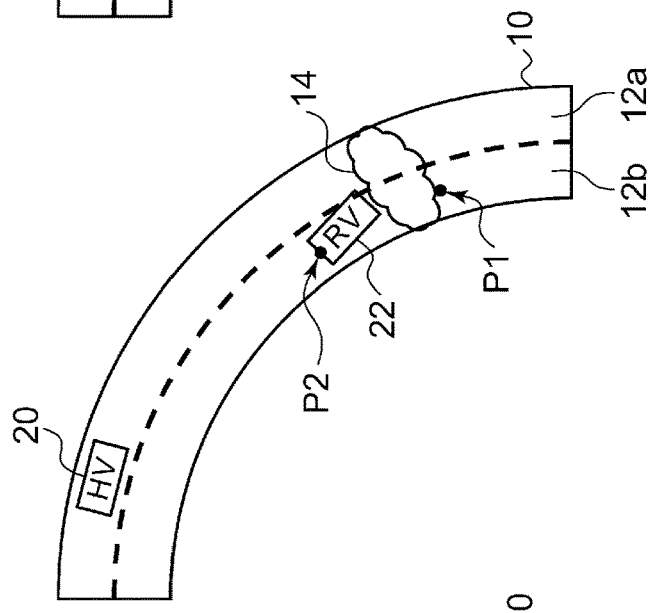
Figure 3C:
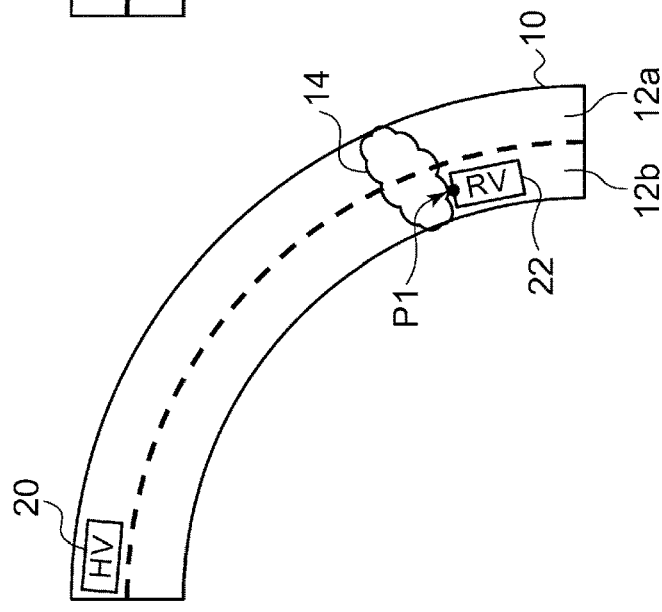

FIGS. 3A-3C show an outline of another process in the host vehicle 20. Like FIGS. 2A-2D, FIGS. 3A-3C show a case where the host vehicle 20 and the remote vehicle 22 travel in opposite directions. Meanwhile, the road 10, the first lane 12a, and the second lane 12b are curved. FIG. 3A shows a situation similar to that of FIG. 2A. As the remote vehicle 22 enters the frozen area 14, ABS is activated at point P1, generating a control loss event. The remote vehicle 22 includes an event occurrence notification in the transmission. The host vehicle 20 receives the event occurrence notification and the second positioning information. Further, the host vehicle 20 derives the first approach time that is expected to elapse until the host vehicle approaches the remote vehicle 22 at point P1, based on the first positioning information and the second positioning information. When the first approach time is equal to or less than the threshold value, the host vehicle 20 outputs an alert to the driver.

FIG. 3B shows a situation that occurs after the situation in FIG. 3A and shows a situation similar to that of FIG. 2B. The remote vehicle 22 advances to point P2 while the control loss event is continued. The remote vehicle 22 includes an event occurrence notification in the transmission. The host vehicle 20 derives the first approach time that is expected to elapse until the host vehicle 20 approaches the remote vehicle 22 at point P2. The host vehicle 20 also compares point P1 and point P2 where the events have occurred. The host vehicle 20 selects point P2 closer to the host vehicle 20 and derives the second approach time that is expected to elapse until the host vehicle 20 approaches point P2 where the event has occurred. When at least one of the first approach time and the second approach time is equal to or less than a threshold value, the host vehicle 20 outputs an alert to the driver.

FIG. 3C shows a situation that occurs after the situation in FIG. 3B. The remote vehicle 22 overruns as far as point P3 outside the road 10 while the control loss event is continued. The remote vehicle 22 includes an event occurrence notification in the transmission. The host vehicle 20 receives the event occurrence notification and the second positioning information. Point P3 outside the road 10 is a position where the host vehicle 20 should travel so that the remote vehicle 22 at point P3 is not targeted in the process. Therefore, the host vehicle 20 does not derive the first approach time that is expected to elapse until the host vehicle 20 approaches the remote vehicle 22 at point P3. Since point P3 is not targeted in the process, the host vehicle 20 derives, for a second time, the second approach time already acquired that is expected to elapse until the host vehicle 20 approaches point P2. In other words, an alert for point P2 could be output even when the remote vehicle 22 is no longer targeted in the process.

Figure 4A:
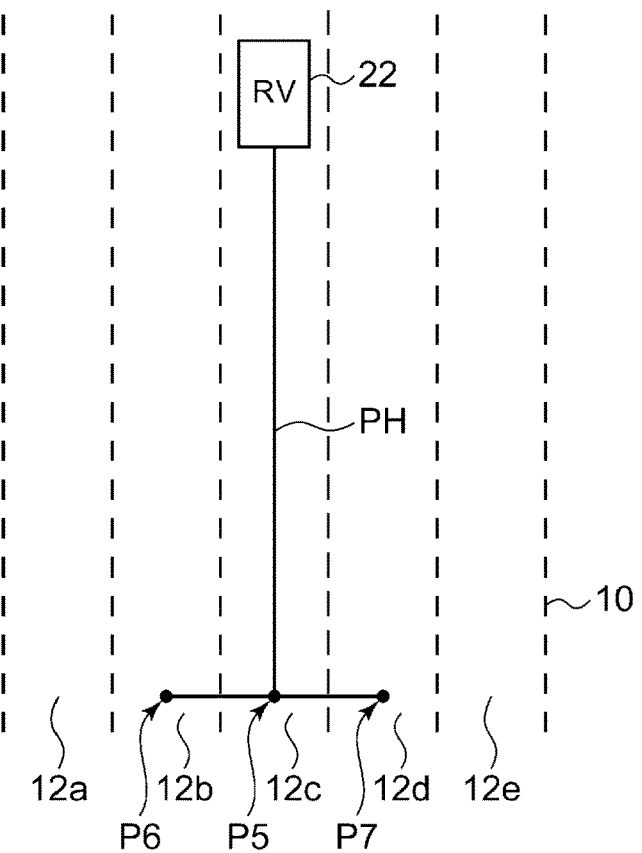
FIGS. 4A-4b show a scene in which assistance is provided according to the embodiment.
Figure 4B:
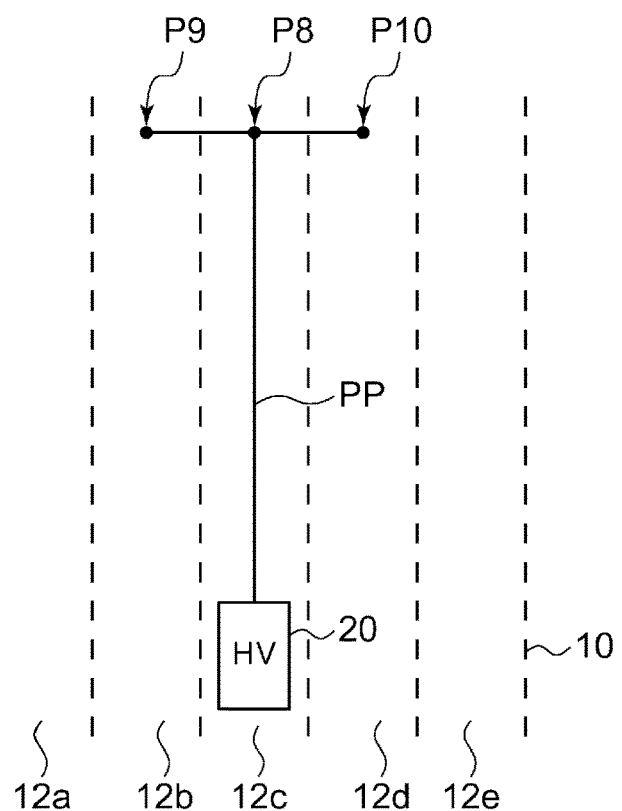

FIGS. 4A-4B show a scene in which assistance is provided. The figures show five lanes from the first lane 12a through the fifth lane 12e. Referring to FIG. 4A, it is assumed that the direction of travel on the lanes 12 is upward. As the remote vehicle 22 travels, the record of driving of the remote vehicle 22 is shown as path history (PH). For derivation of PH, a publicly known technology is used, and a description thereof is omitted. The figure shows point P5 on the PH, point P6 shifted from PH to the left by one lane, and point P7 shifted from PH to the right by one lane. When the host vehicle 20 is traveling between point P5 and point P7, it means that the host vehicle 20 is following the remote vehicle 22, and the remote vehicle 22 is targeted in the process in the host vehicle 20. In other words, given that the remote vehicle 22 is traveling on the third lane 12c, the remote vehicle 22 will be targeted in the process in the host vehicle 20 provided that the host vehicle 20 is traveling on any of the second lane 12b through the fourth lane 12d. Further, given the same situation, the remote vehicle 22 will not be targeted in the process in the host vehicle 20 provided that the host vehicle 20 is traveling on the first lane 12a or the fifth lane 12e.

Referring to FIG. 4B, it is assumed that the direction of travel on the third lane 12c is upward. The host vehicle 20 is traveling, and the route that the host vehicle 20 is expected to travel is shown as a path prediction (PP). For derivation of PP, a publicly known technology is used, and a description thereof is omitted. The figure shows point P8 on PP, point P9 shifted from PP to the left by one lane, and point P10 shifted from PP to the right by one lane. When the remote vehicle 22 is traveling between point P9 and point P10, the remote vehicle 22 is targeted in the process in the host vehicle 20. When the host vehicle 20 and the remote vehicle 22 are traveling in the same direction, it means that the host vehicle 20 is following the remote vehicle 22. When the host vehicle 20 and the remote vehicle 22 are traveling in opposite directions, the host vehicle 20 and the remote vehicle 22 will pass each other. In other words, given that the host vehicle 20 is traveling on the third lane 12c, the remote vehicle 22 will be targeted in the process in the host vehicle 20 provided that the remote vehicle 22 is traveling on any of the second lane 12b through the fourth lane 12d. Further, given the same situation, the remote vehicle 22 will not be targeted in the process in the host vehicle 20 provided that the remote vehicle 22 is traveling on the first lane 12a or the fifth lane 12e.

Figure 5:
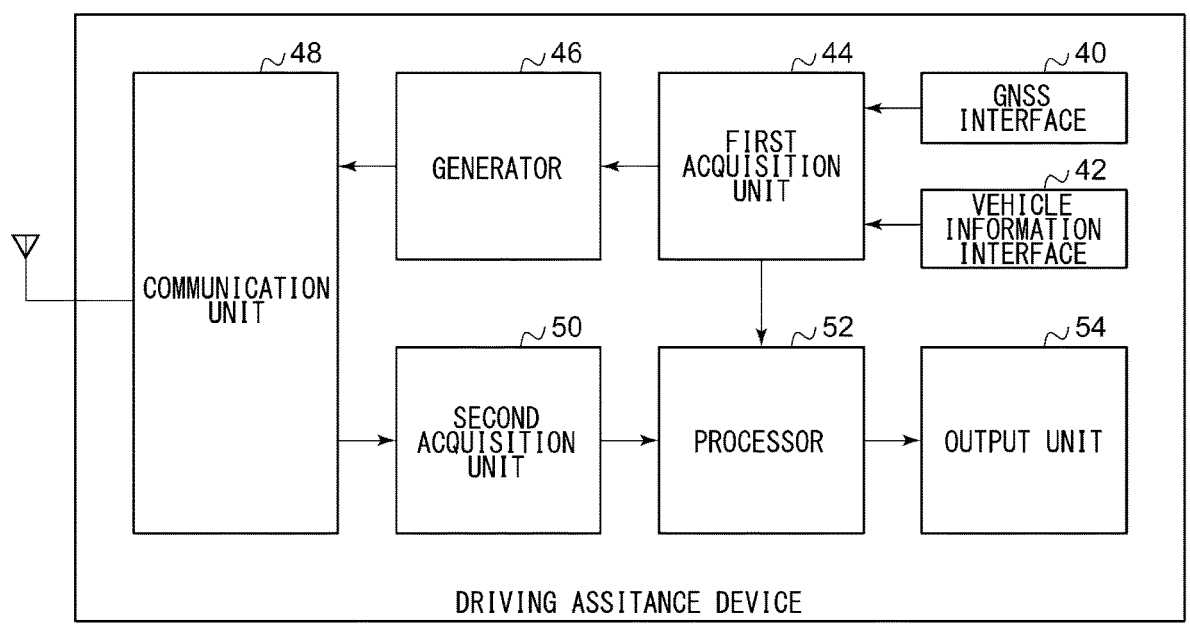
FIG. 5 shows a configuration of the driver assistance device according to the embodiment.

FIG. 5 shows a configuration of the driver assistance device 30. The figure shows a configuration of the driver assistance device 30 mounted on the host vehicle 20, but the driver assistance device 30 mounted on the remote vehicle 22 may be configured similarly. The driver assistance device 30 includes a global navigation satellite system (GNSS) interface 40, a vehicle information interface 42, a first acquisition unit 44, a generation unit 46, a communication unit 48, a second acquisition unit 50, a processing unit 52, and an output unit 54.

The GNSS interface 40 is connected to a GNSS receiver for receiving a signal from a GNSS satellite (not shown) and acknowledges position information, orientation information, and speed information measured by the GNSS receiver. The GNSS interface 40 outputs these items of information to the first acquisition unit 44. The vehicle information interface 42 is connected to a vehicle-mounted network such as a controller area network (CAN). When an emergency control loss event occurs in the host vehicle 20, the vehicle information interface 42 acknowledge information indicating that the control loss event has occurred. As described above, the control loss event is exemplified by activation of ABS, TCS, or SCS. The vehicle information interface 42 may also acknowledge vehicle status such as speed information, a gyro sensor value, an acceleration sensor value, or the like. The vehicle information interface 42 outputs these items of information to the first acquisition unit 44.

The first acquisition unit 44 acquires the position information, orientation information, and speed information from the GNSS interface 40 as the first positioning information. The first positioning information is information related to the host vehicle 20. Position information is given by the latitude and longitude. Orientation information is given by an orientation angle. An angle measured in the clockwise direction is defined as a positive angle, north being the reference orientation (0°). Speed information is given by a speed per hour or a speed pulse value per a unit time. When a control loss event occurs in the host vehicle 20, the first acquisition unit 44 acknowledges, as an event occurrence notification, information indicating that the control loss even has occurred from the vehicle information interface 42. The first acquisition unit 44 outputs the first positioning information to the generation unit 46 and the processing unit 52. The first acquisition unit 44 also outputs the event occurrence notification to the generation unit 46.

The generation unit 46 acknowledges the first positioning information from the first acquisition unit 44. The generation unit 46 generates a packet signal including the first positioning information and the vehicle ID of the host vehicle 20. When an event occurrence notification is acknowledged from the first acquisition unit 44, the generation unit 46 also includes the event occurrence notification in the packet signal. It will be assumed here that a control loss event has not occurred in the host vehicle 20, and an event occurrence notification is not included in the packet signal. The generation unit 46 outputs the packet signal to the communication unit 48. The communication unit 48 in a transmission process receives the packet signal from the generation unit 46. The communication unit 48 performs CSMA/CA and broadcasts the packet signal. The communication unit 48 in a reception process also receives a packet signal from the driver assistance device 30 mounted on the remote vehicle 22. The communication unit 48 outputs the received packet signal to the second acquisition unit 50. This represents vehicle-to-vehicle communication. The generation unit 46 may subject a signal to a security process such as encryption, but a description thereof is omitted here.

The second acquisition unit 50 acknowledges the packet signal from the communication unit 48. The second acquisition unit 50 acquires the position information, orientation information, and speed information included in the packet signal as the second positioning information. The second positioning information is information related to the remote vehicle 22. The second acquisition unit 50 outputs the second positioning information to the processing unit 52. When a control loss event occurs in the remote vehicle 22, the second acquisition unit 50 acquires the event occurrence notification included in the packet signal. The second acquisition unit 50 also outputs the event occurrence notification to the processing unit 52.

The processing unit 52 acknowledges the first positioning information from the first acquisition unit 44 and acknowledges the second positioning information, the event occurrence information, and the vehicle ID of the remote vehicle 22 from the second acquisition unit 50. Hereinafter, (1) the process for determining whether the host vehicle 20 approaches the remote vehicle 22 where a control loss event occurs (hereinafter, "remote vehicle approximation determination process"), (2) the process for determining whether the host vehicle 20 approaches the site of occurrence of the control loss event (hereinafter, "site approximation determination process") will be described in the stated order. This is followed by a description of (3) the process for making a selection between the approach to the remote vehicle 22 and the approach to the site (hereinafter, "selection process").

(1) Remote Vehicle Approximation Determination Process

Figure 6:
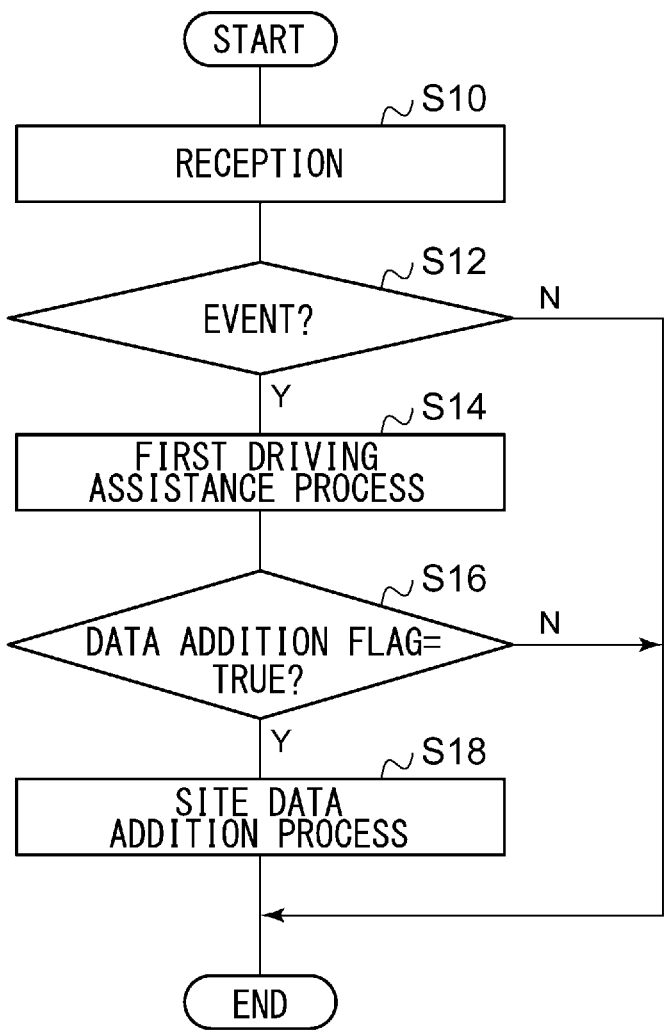
FIG. 6 is a flowchart showing a sequence of steps performed by the driver assistance device of FIG. 5 in a remote vehicle approximation determination process.

FIG. 6 is a flowchart showing a sequence of steps performed by the driver assistance device 30 in a remote vehicle approximation determination process. The processing unit 52 acknowledges a packet signal from the remote vehicle 22 received in the communication unit 48 (step S10). When an event occurrence notification is included in the packet signal (Y in step S12), the processing unit 52 performs the first driver assistance process (step S14). The first driver assistance process will be described later. When the data addition flag is set to "True" in the first driver assistance process (Y in step S16), the processing unit 52 performs a site data addition process (step S18). The site data addition process will also be described later. When an event occurrence notification is not included in the packet signal (N in step S12), or when the data addition flag is not set to "True", (N in step S16, the remote vehicle approximation determination process is terminated.

Figure 7:
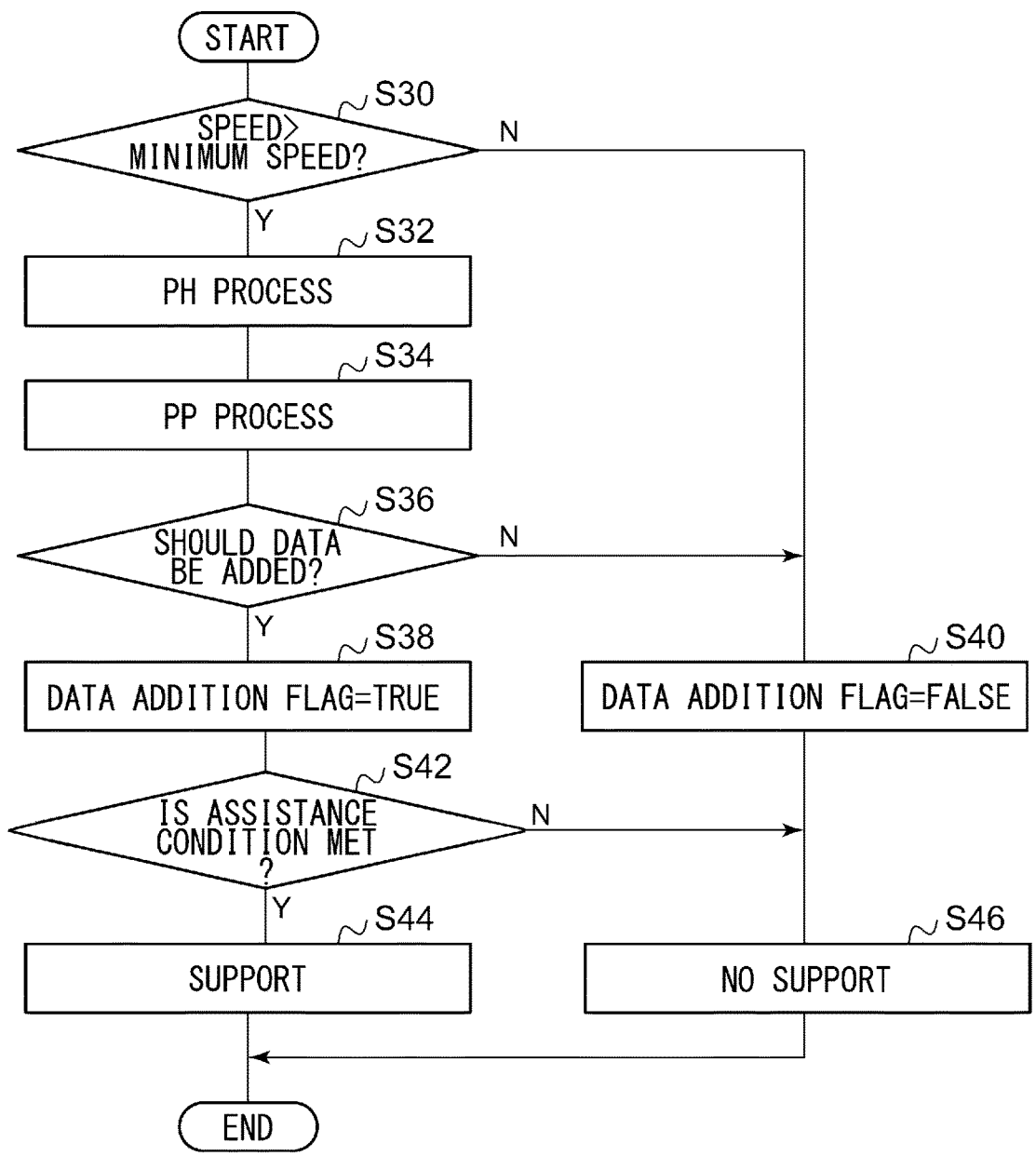
FIG. 7 is a flowchart showing a sequence of steps in the first driver assistance process of FIG. 6.

FIG. 7 is a flowchart showing a sequence of steps in the first driver assistance process and is a flowchart showing a sequence of steps in step S14 of FIG. 6. When the speed information on the remote vehicle 22 in the second positioning information indicates a speed higher than the minimum speed (Y in S30), the processing unit 52 performs the PH process based on the second positioning information (step S32) and performs the PP process based on the first positioning information (step S34). For the PH process and the PP process, a publicly known technology may be used, and a description thereof is omitted here. The processing unit 52 determines, based on the first positioning information and the second positioning information, whether the host vehicle 20 are relatively positioned such that the host vehicle 20 is following or passing by the remote vehicle 22 and whether the vehicles are at relative positions shown in FIGS. 4A-4B targeted in the process. When it is determined that the vehicles are at the relative positions as illustrated, the processing unit 52 determines that data should be added (Y in step S36) and sets the data addition flag to "True" (step S38). When it is determined that the vehicles are not at the relative positions as illustrated, the processing unit 52 determines that data should not be added (N in step S36) and sets the data addition flag to "False" (step S40). The processing unit 52 also sets the data addition flag to "False" (step S40) when the speed information in the second positioning information indicates a speed not higher than the minimum speed threshold value (N in step S30). This is because of the absence of the remote vehicle 22 targeted in the process.

When the processing unit 52 sets the data addition flag to "True", the processing unit 52 determines whether an assistance condition is met (step S42). For example, the processing unit 52 (1) determines whether the speed indicated by the speed information on the host vehicle 20 in the first positioning information is included in a range between the first speed V1 [m/s] and the second speed V2 [m/s]. The first speed V1 and the second speed V2 are predetermined values such that the first speed V1<the second speed V2.

The processing unit 52 (iii) derives a distance along the road between the host vehicle 20 and the remote vehicle 22 based on the position information in the first positioning information and the position information in the second positioning information and derives a relative speed by referring to the speed information in the first positioning information and the speed information in the second positioning information. When the host vehicle 20 is following the remote vehicle 22, for example, the relative speed is derived by subtracting the speed information in the second positioning information from the speed information in the first positioning information. When the host vehicle 20 is passing by the remote vehicle 22, the relative speed is derived by adding the speed information in the first positioning information and the speed information in the second positioning information. Further, the processing unit 52 derives the first approach time T1 by dividing the distance along the road by the relative speed. The first approach time T1 [s] indicates the time that is expected to elapse until the host vehicle 20 approaches the remote vehicle 22. The processing unit 52 determines whether the first approach time T1 is equal to or less than a predefined threshold value.

When the assistance conditions (i) through (iii) are met (Y in step S42), the processing unit 52 determines to provide assistance (step S44). When at least one of the assistance conditions (i) through (iii) is not met (N in step S42), the processing unit 52 determines to provide assistance (step S46). When the processing unit 52 sets the data addition flag to "False", the processing unit 52 determines not to provide assistance (step S46).

Figure 8:
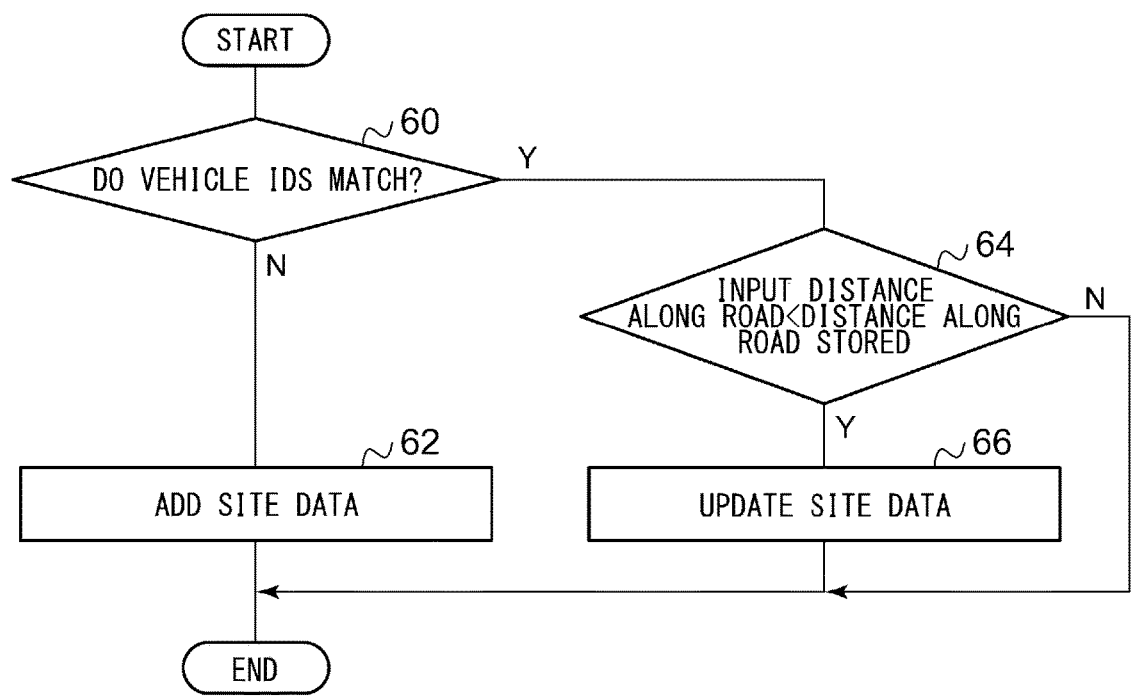
FIG. 8 is a flowchart showing a sequence of the site data addition process of FIG. 6.

FIG. 8 is a flowchart showing a sequence of the site data addition process and is a flowchart showing a sequence of steps in step S18 of FIG. 6. When the vehicle IDs do not match (N in step S60), the processing unit 52 adds site data (step S62). When the vehicle IDs match (Y in S60), the processing unit 52 updates the site data (step S66) when the distance along the road to the site indicated by the input site data is smaller than the distance along the road indicated by the site data stored (Y in step S64). The distance along the road is derived based on the position information on the host vehicle 20 indicating the same position. Meanwhile, when the input distance along the road is not smaller than distance along the road stored (N in step S64), step S66 is skipped. In other words, the position information on the site where the event has occurred is updated by selecting one of: the position information included in the second positioning information; and the position information included in the past second positioning information acquired while the event is continued that indicates a position closer to the position indicated by the position information included in the first positioning information.

(2) Site Approximation Determination Process

Figure 9:
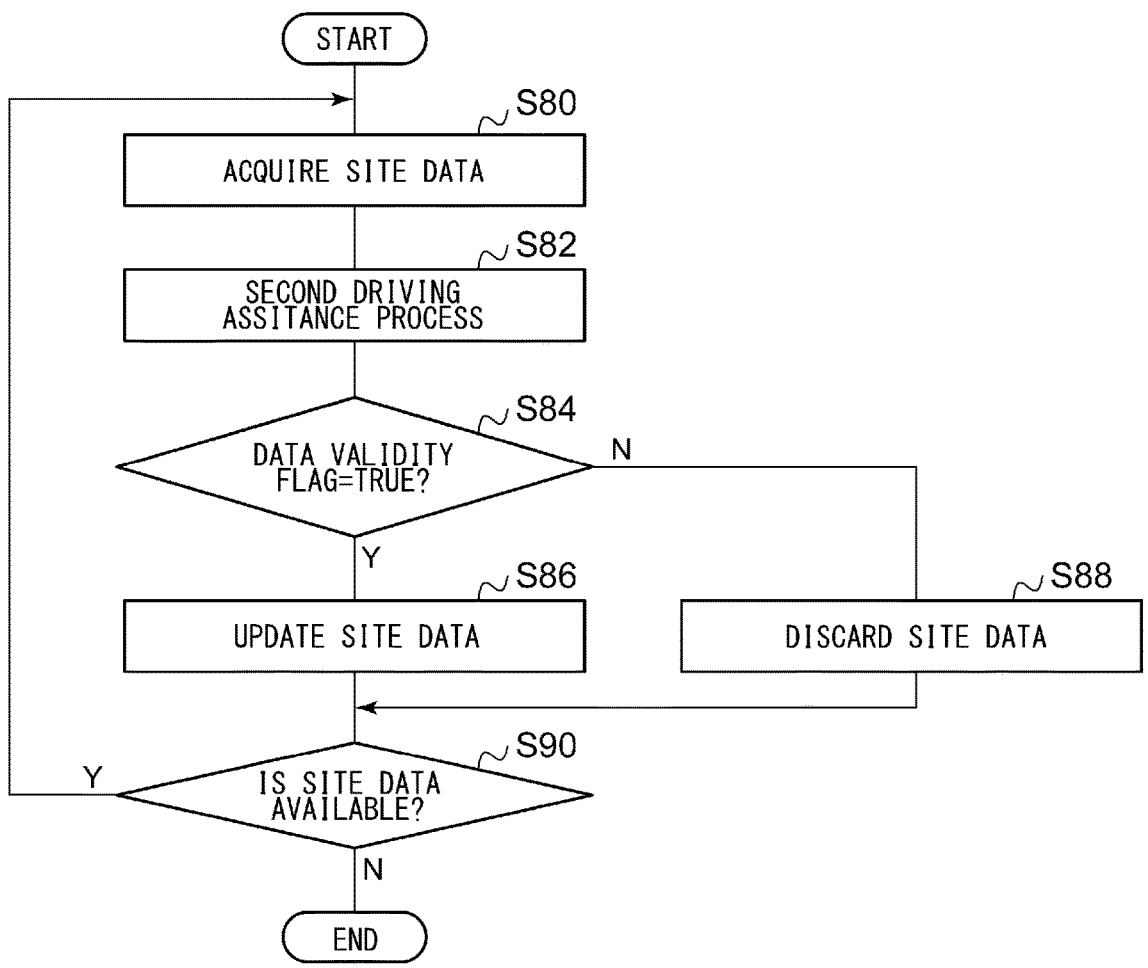
FIG. 9 is a flowchart showing a sequence of steps performed by the driver assistance device of FIG. 5 in the site approximation determination process.

FIG. 9 is a flowchart showing a sequence of steps performed by the driver assistance device 30 in the site approximation determination process. For example, the process is performed after the remote vehicle approximation determination process shown in FIG. 6 is terminated. The processing unit 52 acquires site data (step S80). When the site data is added or updated in FIG. 8, the added or updated site data is acquired. The processing unit 52 performs the second driver assistance process (step S82). The second driver assistance process will be described later. When the data validity flag is set to "True" in the second driver assistance process (Y in step S84), the processing unit 52 performs a site data updating process (step S86). The distance along the road to the site indicated by the site data stored is updated to the latest value. Meanwhile, when the data validity flag is not set to "True" in the first driver assistance process (N in step S84), the processing unit 52 discards the site data (step S88). When the site data is available (Y in step S90), control is returned to step S80. When the site data is not available (N in step S90), the process is terminated.

Figure 10:
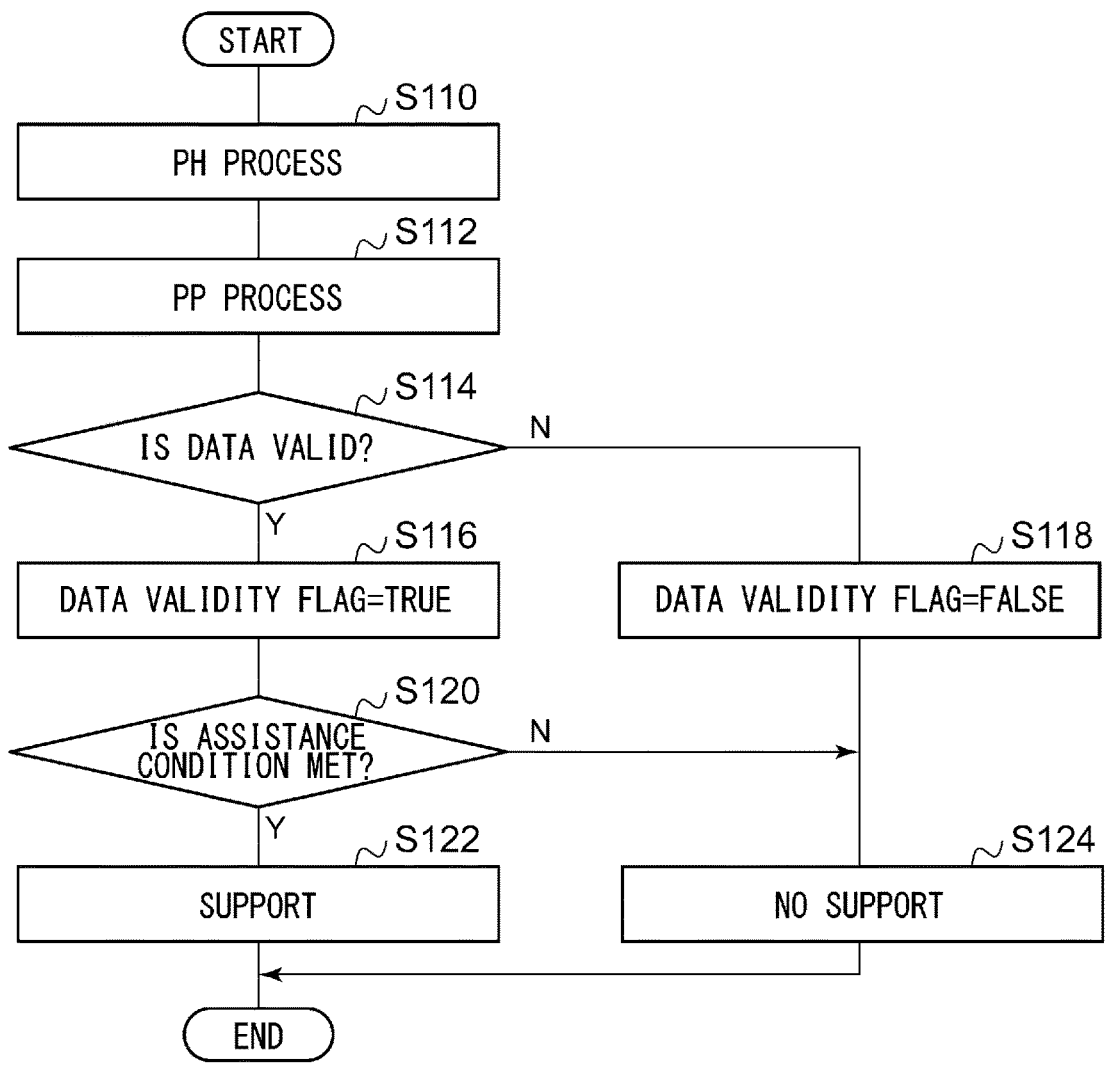
FIG. 10 is a flowchart showing a sequence of steps in the second driver assistance process of FIG. 9.

FIG. 10 is a flowchart showing a sequence of steps in the second driver assistance process and is a flowchart showing a sequence of steps in step S82 of FIG. 9. The processing unit 52 performs the PH process based on the second positioning information (step S110) and performs the PP process based on the first positioning information (step S112). For the PH process and the PP process, a publicly known technology may be used, and a description thereof is omitted here. The processing unit 52 determines, based on the first positioning information and the second positioning information, whether the host vehicle 20 and the remote vehicle 22 are relatively positioned such that the host vehicle 20 is following or passing by the remote vehicle 22. When it is determined that the vehicles are at the designated relative positions, the processing unit 52 determines that the data is valid (Y in step S114) and sets the data validity flag to "True" (step S116). When it is determined that the vehicles are not at the designated relative positions, the processing unit 52 determines that the data is not valid (N in step S114) and sets the data validity flag to "False" (step S118). Thus, unlike the first driver assistance process, the second driver assistance process does not determine whether the vehicles are at relative positions shown in FIGS. 4A-4B targeted in the process. Therefore, driver assistance according to the second approach time T2 described later may be continued even after driver assistance according to the first approach time T1 is no longer provided.

When the processing unit 52 sets the data validation flag to "True", the processing unit 52 determines whether an assistance condition is met (step S120). The determination may be made in a manner similar to step S42 of FIG. 7. In the determination in (iii), the relative speed is not used, and the speed information on the host vehicle 20 included in the first positioning information is used. In other words, the processing unit 52 derives the second approach time T2 [s] by dividing the distance along the road by the speed information on the host vehicle 20. The second approach time T2 indicates the time that is expected to elapse until the host vehicle 20 approaches the site where the event has occurred. The processing unit 52 determines whether the second approach time T2 is equal to or less than a predefined threshold value. When the assistance conditions (i) through (iii) are met (Y in step S120), the processing unit 52 determines to provide assistance (step S122). When at least one of the assistance conditions (i) through (iii) is not met (N in step S120), the processing unit 52 determines not to provide assistance (step S124). When the processing unit 52 sets the data validity flag to "False", the processing unit 52 determines not to provide assistance (step S124).

(3) Selection Process

Figure 11:
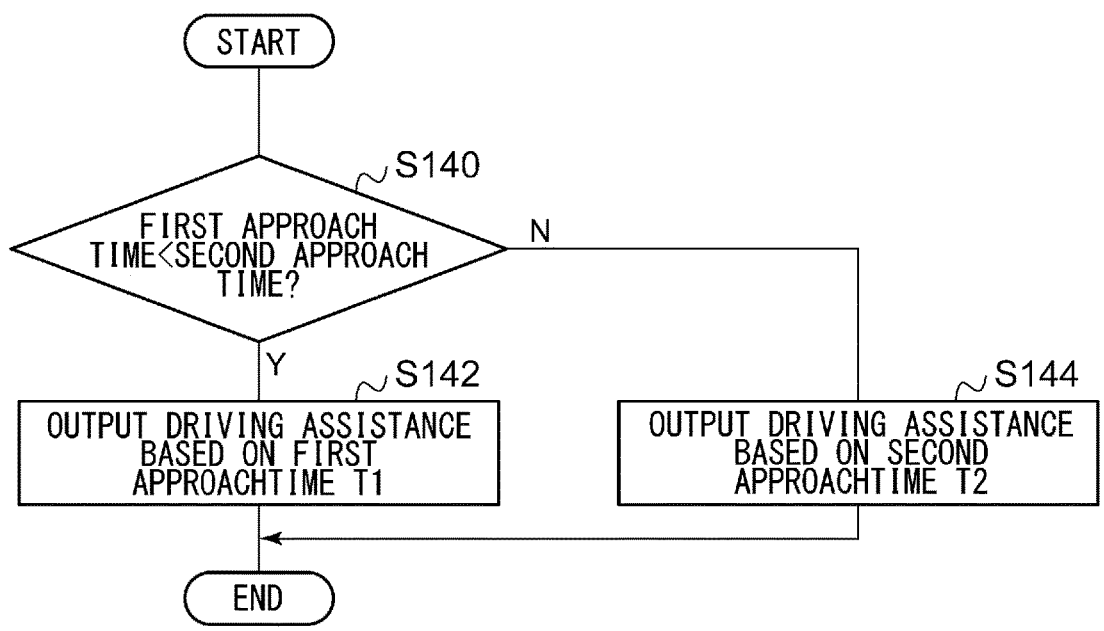
FIG. 11 is a flowchart showing a sequence of selection steps performed by the driver assistance device.

FIG. 11 is a flowchart showing a sequence of selection steps performed by the driver assistance device 30. The process is performed after the site approximation determination process shown in FIG. 9 is terminated. The processing unit 52 acquires the first approach time T1 for which a determination is made to provide assistance and the second approach time T2 for which a determination is made to provide assistance. When the first approach time T1 is less than the second approach time T2 (Y in step S140), the processing unit 52 determines to output driver assistance based on the first approach time T1 (step S142). When the first approach time T1 is not less than the second approach time T2 (N in step S140), the processing unit 52 determines to output driver assistance based on the second approach time T2 (step S144). In other words, the processing unit 52 determines to provide driver assistance in accordance with the smaller of the first approach time T1 and the second approach time T2.

When a determination is made to provide assistance for the first approach time T1, and a determination is made not to provide assistance for the second approach time T2, the processing unit 52 determines to output driver assistance based on the first approach time T1. When a determination is made to provide assistance for the second approach time T2, and a determination is made not to provide assistance for the first approach time T1, the processing unit 52 determines to output driver assistance based on the second approach time T2. Meanwhile, when a determination is made not to provide assistance for the first approach time T1 and the second approach time T2, the processing unit 52 determines not to output driver assistance.

When the processing unit 52 determines to output driver assistance, the output unit 54 displays an alert message on a monitor (not shown) or the like. In this process, a message indicating that the remote vehicle 22 should be minded may be displayed when driver assistance based on the first approach time T1 is output, and a message indicating that the site where the event has occurred should be minded when driver assistance based on the second approach time T2 is output.

The features are implemented in hardware such as a central processing unit (CPU), a memory, or other large scale integration (LSI) of an arbitrary computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

According to the embodiment, a determination is made on the approach to a site where a control loss event has occurred as well as the approach to a remote vehicle. Accordingly, the driver of the host vehicle is alerted of the site where the control loss event has occurred as well. Since the driver of the host vehicle is alerted of the site where the control loss event has occurred as well, driving is prevented from becoming more dangerous even in the presence of a remote vehicle that is controlled unusually. Since the position information on a site where a control loss event has occurred closer to the position indicated by the position information on the host vehicle included in the first positioning information is selected, the site of high emergency where the control loss event has occurred is used for driver assistance. Since the site of high emergency where the control loss event has occurred is used for driver assistance, the driver of the host vehicle is alerted of the site of high emergency where the control loss event has occurred. Since driver assistance based on the smaller of the first approach time T1 and the second approach time T2 is output, the driver is alerted of the time of higher emergency. Since driver assistance in accordance with the second approach time is continued even when driver assistance in accordance with the first approach time is no longer provided, a determination can be made on the approach to the site where the control loss event has occurred.

One embodiment of the disclosure is summarized below. A driver assistance device according to an embodiment of the disclosure is configured to be mounted on a vehicle, and includes: a first acquisition unit that acquires first positioning information including position information and speed information on a host vehicle; a second acquisition unit that acquires: second positioning information including position information and speed information on a remote vehicle; and an event occurrence notification indicating an occurrence of an event in the remote vehicle; and an output unit that outputs, in the event that the second acquisition unit has acquired an event occurrence notification, driver assistance in accordance with at least one of: (1) a first approach time derived based on the position information included in the second positioning information, the position information included in the first positioning information, and a relative speed identified by referring to the speed information included in the first positioning information and the speed information included in the second positioning information, the first approach time being expected to elapse until the host vehicle approaches the remote vehicle; and (2) a second approach time derived based on position information on a site where the event has occurred updated based on the position information included in the second positioning information, the position information included in the first positioning information, and the speed information included in the first positioning information, the second approach time being expected to elapse until the host vehicle approaches the site where the event has occurred.

According to the embodiment, driver assistance is output by determining the approach to the remote vehicle and the approach to the site where the event has occurred. Accordingly, driving is prevented from becoming more dangerous even in the presence of a remote vehicle that is controlled unusually.

The position information on the site where the event has occurred may be updated in the output unit by selecting one of the position information included in the second positioning information and the position information included in the past second positioning information acquired while the event is continued that is closer to the position indicated by the position information included in the first positioning information. In this case, the position information indicating a site where the event has occurred that is closer to the position indicated by the position information included in the first positioning information is selected so that the site of higher emergency where the event has occurred is used for driver assistance.

The output unit may output driver assistance in accordance with the smaller of the first approach time and the second approach time. In this case, the driver is alerted of the time of higher emergency because driver assistance in accordance with the smaller of the first approach time and the second approach time is output.

The output unit may continue driver assistance in accordance with the second approach time even when driver assistance in accordance with the first approach time is no longer provided. In this case, a determination is made on the approach to the site where the event has occurred is made because driver assistance in accordance with the second approach time is continued even when driver assistance in accordance with the first approach time is no longer provided.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

In the embodiment, the host vehicle 20 and the remote vehicle 22 are assumed to be automobiles. Alternatively, the host vehicle 20 and the remote vehicle 22 may not be an automobile. For example, the host vehicle 20 and the remote vehicle 22 may be a motorcycle or the like. According to this variation, the flexibility in the configuration is improved.

In the embodiment, one remote vehicle 22 is targeted in the process. Alternatively, a plurality of remote vehicles 22 may be targeted in the process. In that case, the remote vehicle approximation determination process and the site approximation determination process in the processing unit 52 are performed for the respective remote vehicles 22, and the selection process is performed for the plurality of remote vehicles 22. According to this variation, the flexibility in the configuration is improved.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2018-071017, filed on Apr. 2, 2018, the entire contents of which are incorporated herein by reference.

What is claimed is:

1. A driver assistance device configured to be mounted on a first vehicle, the driver assistance device comprising:
an input circuit configured to receive first positions of the first vehicle, first speeds of the first vehicle, second positions of a second vehicle, second speeds of the second vehicle, and events of the second vehicle, each of the first positions being on a timeline, each of the first speeds being on the timeline, each of the second positions being on the timeline, each of the second speeds being on the timeline, each of the events being on the timeline, at least parts of the second positions corresponding to the events of the second vehicle; and
an output circuit configured to output information to a driver of the first vehicle, wherein
the driver assistance device derives a first approach time based on at least a first current position of the first positions of the first vehicle, a first current speed of the first speeds of the first vehicle, a second current position of the second positions of the second vehicle, and a second current speed of the second speeds of the second vehicle, the second current position of the second positions of the second vehicle corresponding to a first event of the events of the second vehicle,
the driver assistance device further derives a second approach time based on at least the first current position of the first positions of the first vehicle, the first current speed of the first speeds of the first vehicle, and a past position of the second positions of the second vehicle, the past position of the second positions of the second vehicle corresponding to a second event of the events of the second vehicle, and
the output circuit outputs the information to the driver of the first vehicle based on at least the first approach time and the second approach time.

2. The driver assistance device according to claim 1, wherein
when the first approach time is less than the second approach time, the output circuit outputs the information to the driver in accordance with the first approach time, and when the second approach time is less than the first approach time, the output circuit outputs the information to the driver in accordance with the second approach time.

3. The driver assistance device according to claim 1, wherein
after the output circuit outputs the information to the driver in accordance with the first approach time, the output circuit continues to output the information to the drive in accordance with the second approach time.

4. The driver assistance device according to claim 1, wherein
the output circuit is configured to output an event position,
when the second current position of the second positions of the second vehicle is closer to the first current position of the first positions of the first vehicle than the past position of the second positions of the second vehicle, the output circuit outputs the second current position of the second positions of the second vehicle as the event position, and
when the past position of the second positions of the second vehicle is closer to the first current position of the first positions of the first vehicle than the second current position of the second positions of the second vehicle, the output circuit outputs the past position of the second positions of the second vehicle as the event position.

5. The driver assistance device according to claim 1, wherein
the input circuit includes at least a global navigation satellite system interface circuit, a vehicle information interface circuit, and a communication circuit, the communication circuit configured to communicate with the second vehicle via an antenna.

6. The driver assistance device according to claim 1, wherein
the output circuit includes a monitor.

7. The driver assistance device according to claim 1, wherein
the output circuit is configured to output the information to the driver of the first vehicle, with the information including an alert message.

8. The driver assistance device according to claim 1, further comprising:
a processing circuit,
the processing circuit is configured to cause:
the driver assistance device to derive the first approach time;
the driver assistance device to derive the second approach time; and
the output circuit to output the information to the driver of the first vehicle.

9. A driver assistance device configured to be mounted on a first vehicle, the driver assistance device comprising:
an input means for receiving first positions of the first vehicle, first speeds of the first vehicle, second positions of a second vehicle, second speeds of the second vehicle, and events of the second vehicle, each of the first positions being on a timeline, each of the first speeds being on the timeline, each of the second positions being on the timeline, each of the second speeds being on the timeline, each of the events being on the timeline, at least parts of the second positions corresponding to the events of the second vehicle; and
an output means for outputting information to a driver of the first vehicle, wherein
the driver assistance device derives a first approach time based on at least a first current position of the first positions of the first vehicle, a first current speed of the first speeds of the first vehicle, a second current position of the second positions of the second vehicle, and a second current speed of the second speeds of the second vehicle, the second current position of the second positions of the second vehicle corresponding to a first event of the events of the second vehicle,
the driver assistance device further derives a second approach time based on at least the first current position of the first positions of the first vehicle, the first current speed of the first speeds of the first vehicle, and a past position of the second positions of the second vehicle, the past position of the second positions of the second vehicle corresponding to a second event of the events of the second vehicle, and
the output circuit outputs the information to the driver of the first vehicle based on at least the first approach time and the second approach time.

10. A driver assistance device configured to be mounted on a first vehicle, the driver assistance device comprising:
a processor; and
a memory including a program that, when executed by the processor, causes the processor to perform operations, the operations including:
receiving first positions of the first vehicle, first speeds of the first vehicle, second positions of a second vehicle, second speeds of the second vehicle, and events of the second vehicle, each of the first positions being on a timeline, each of the first speeds being on the timeline, each of the second positions being on the timeline, each of the second speeds being on the timeline, each of the events being on the timeline, at least parts of the second positions corresponding to the events of the second vehicle;
deriving a first approach time based on at least a first current position of the first positions of the first vehicle, a first current speed of the first speeds of the first vehicle, a second current position of the second positions of the second vehicle, and a second current speed of the second speeds of the second vehicle, the second current position of the second positions of the second vehicle corresponding to a first event of the events of the second vehicle,
deriving a second approach time based on at least the first current position of the first positions of the first vehicle, the first current speed of the first speeds of the first vehicle, and a past position of the second positions of the second vehicle, the past position of the second positions of the second vehicle corresponding to a second event of the events of the second vehicle, and
outputting information to the driver of the first vehicle based on at least the first approach time and the second approach time.

* * * * *